Oct. 28, 1969  J. A. GOODRICH  3,474,971
TWO-PIECE INJECTOR

Filed June 14, 1967  2 Sheets-Sheet 1

INVENTOR.
JOSEPH A. GOODRICH
BY John E. Kelly
AGENT

Oct. 28, 1969  J. A. GOODRICH  3,474,971
TWO-PIECE INJECTOR
Filed June 14, 1967  2 Sheets-Sheet 2
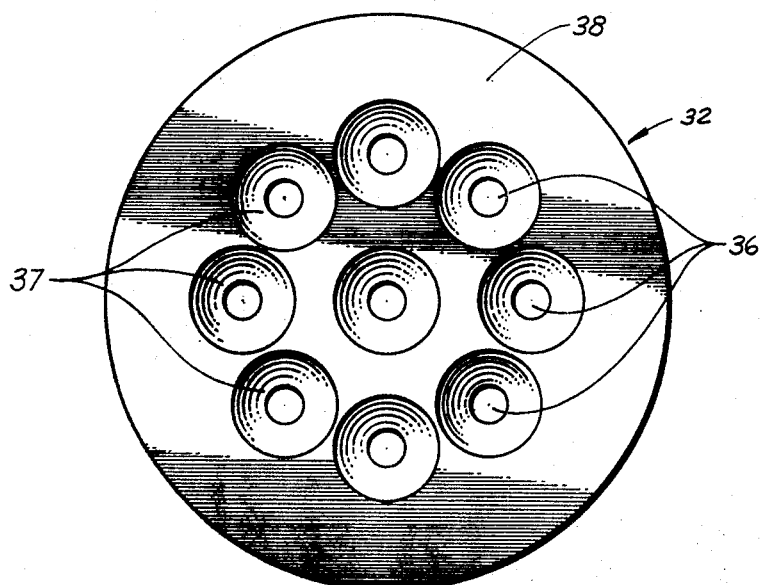
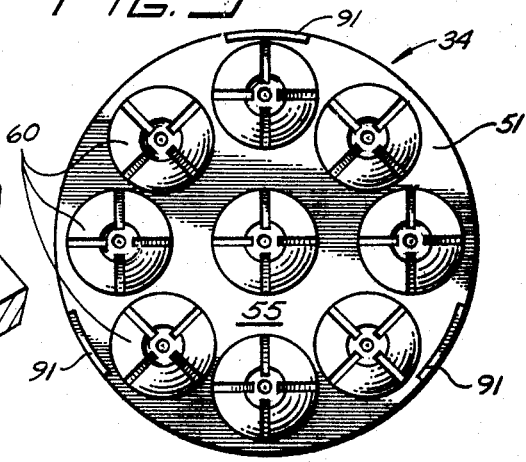
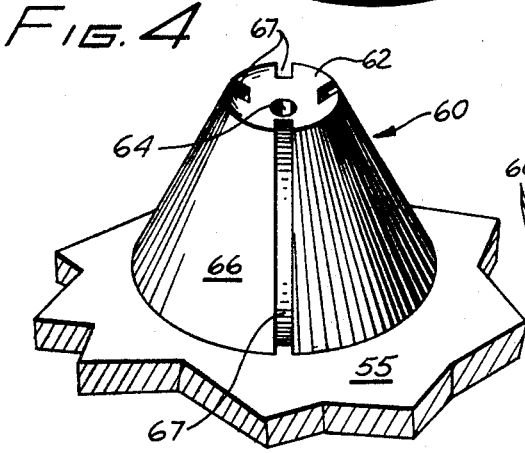
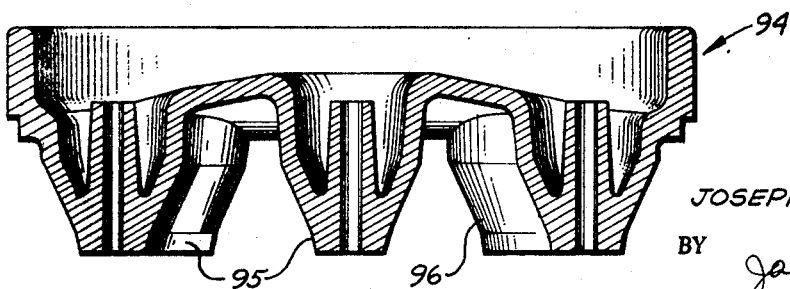
INVENTOR.
JOSEPH A. GOODRICH
BY John E. Kelly
AGENT United States Patent Office 3,474,971
Patented Oct. 28, 1969

3,474,971
TWO-PIECE INJECTOR
Joseph A. Goodrich, Simi, Calif., assignor to North American Rockwell Corporation, a corporation of Delaware
Filed June 14, 1967, Ser. No. 646,037
Int. Cl. B05b 1/14; F23d 11/38
U.S. Cl. 239—558                                       5 Claims

ABSTRACT OF THE DISCLOSURE

An injector for conducting combustible fluid to a combustion chamber, the injector being entirely made from two interfitting components capable of being cast. One component is formed with a plurality of conically shaped spuds which are inserted in and make sealing engagement with a plurality of cavities formed in the other component. Orifices are constituted by grooves extending lengthwise along the outer peripheries of the spuds and adjacent portions of the cavity walls.

BACKGROUND OF THE INVENTION

It is a well established practice to utilize fluid injectors for discharging liquid propellants into the combustion chamber of rocket engines in order to generate a desired thrust level. Conventional injectors are generally intricate assemblies of numerous components that are connected together generally by bolting and/or welding. As the individual connectors and connection joints increase, there is a corresponding increase in the risk that the injector assembly will be defective. It is difficult to precisely match and put together all of the components. To further guarantee the integrity of the overall component a cost penalty in terms of funds and manpower must be suffered. In the case of injector assemblies to be utilized in small tactical armaments that are mass produced there is a high premium on quick low-cost production. Casting the components for an injector is an expeditious and relatively inexpensive technique for making injector components. However, conventional components while they have been manufactured by casting techniques requires subsequent machining or drilling to make the orifices. The injector orifices must conform to exacting standards so that a predictable flow rate and spray pattern may be achieved. Thus far orifices have been drilled or electrical discharge machined which techniques are time consuming and expensive to achieve the critical tolerances.

SUMMARY OF THE INVENTION

Briefly described, an injector formed in accordance with the instant invention includes two cast plates which interfit with one another so as to constitute orifices through which propellant may be discharged into the combustion chamber of a gas generating device such as a rocket motor. One plate is formed with a plurality of projections or spuds whose external peripheries include lengthwise extending grooves. The other plate is formed with apertures designed to receive and seat the spuds. When the two plates are assembled together, portions of them are maintained in spaced relationship so that a propellant containing manifold is formed between the plates. Propellant orifices are defined by the grooves and the oppositely adjacent portions of the cavity walls. By forming the orifices in the very zone where the plates are split from one another, the need to resort to expensive and time consuming drilling techniques is eliminated. The spuds and cavity walls are maintained in fluid tight sealing engagement so that propellant contained in the manifold can be discharged into the combustion chamber only through the orifices. Preferably the spuds and cavities are of complementary conical shape so that when propellant stream issue through the orifices they impinge within the combustion chamber to create the desired spray pattern. In accordance with an alternative embodiment the plate that includes the spuds has a substantially uniform wall thickness so as to minimize the dangers of disparate heating effects. The many advantages of the instant invention will be appreciated when the following detailed description is studied in conjunction with the associated drawings in which:

FIG. 2 is a plan view showing cavities formed in one of the two plates that constitute the injector;

FIG. 3 is a plan view of the other plate showing a plurality of spuds formed with grooves which in part constitute propellant orifices;

FIG. 4 is an enlarged perspective view of an individual spud; and

FIG. 5 is a longitudinal sectional view of one of the plates formed in accordance with an alternative embodiment of the invention.

DESCRIPTION OF THE PREFERRED EMBODIMENT

Figure 1:
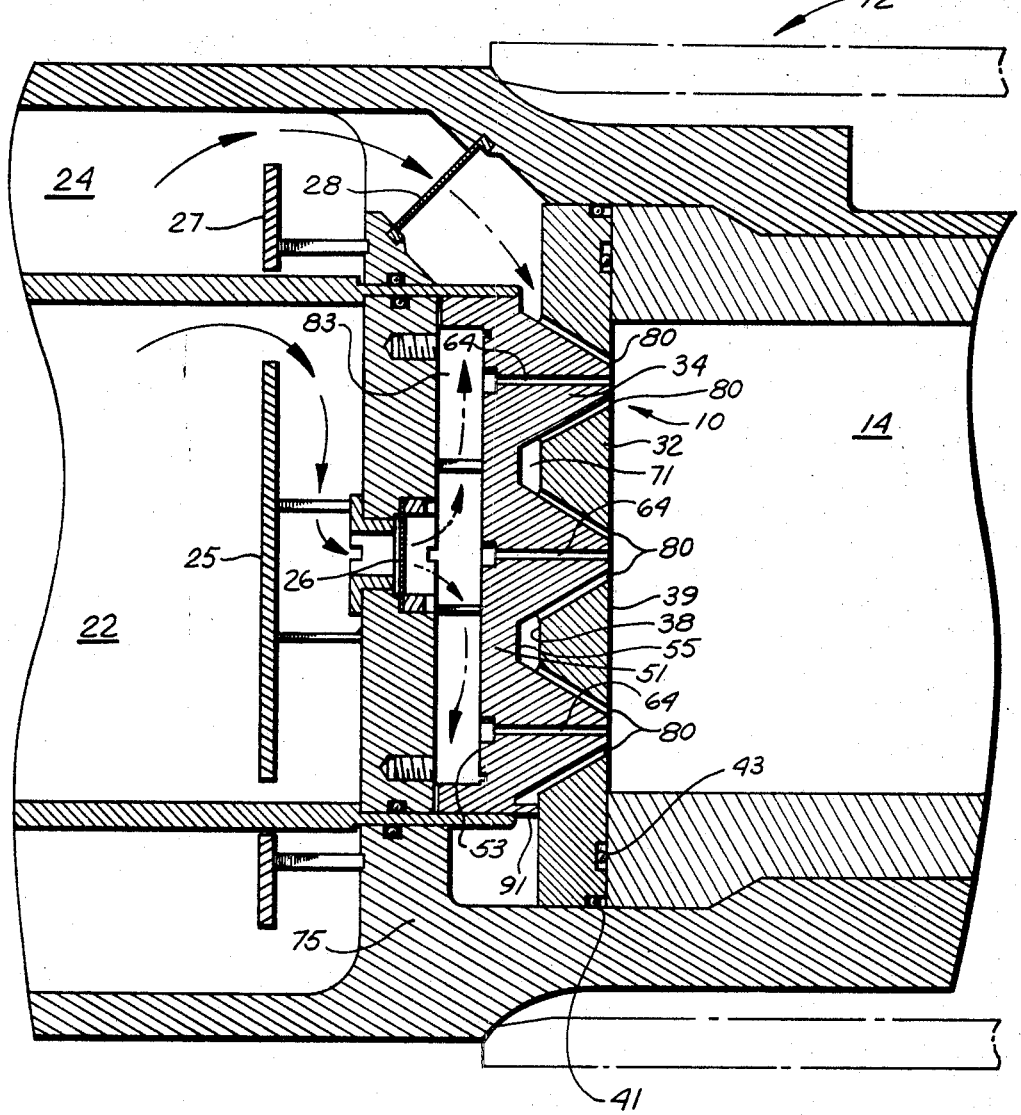
FIG. 1 is a longitudinal sectional view showing the injector of this invention incorporated in a rocket motor.

Referring now to the drawings, FIG. 1 illustrates a two-piece injector 10 of the instant invention incorporated, merely for the purposes of illustration, in a rocket motor 12 designed to generate a fixed level of thrust. It is to be noted that injector 10 may be incorporated in any device that operates to generate gas. Rocket motor 12 which, for example, may be used for small tactical ordinance equipment has a typical combustion chamber 14 into which liquid propellant is delivered for combustion, a thrust region (not shown) and a nozzle section (not shown) through which the combustion product is discharged. On the upstream side of the injector 10 is a cylindrically shaped fuel tank 22 and an annular shaped oxidizer tank 24 aligned concentrically with fuel tank 22. Between injector 10 and fuel tank 22 is a conventional baffle 25 for minimizing fluid propellant surges and sloshing effects, as well as a conventional burst diaphragm 26. In a similar manner, situated between injector 10 and oxidizer tank 24 are a baffle 27 and a burst diaphragm 28.

Injector 10, constructed entirely from two parts, is capable of being manufactured by casting as shall be more fully described below. For the sake of clarity these two components shall be referred to as a face plate 32 and a spud plate 34. Referring now to some of the details on face plate 32, FIG. 2 shows that it is essentially a circular plate formed therethrough with a plurality of conically shaped cavities 36 defined by wall portions 37. Cavities 36 converge from an upstream side 38 to a downstream side 39 best shown in FIG. 1. For sealing purposes, face plate 32 may be formed with annular grooves such as 41 and 43 for O-rings so that potential leakage passageways leading into combustion chamber 14 will be blocked. Spud assembly 34 as shown in FIG. 3 has a back plate section 51 that is integrally united with a plurality of spuds 60 arranged in a predetermined geometric pattern. The number of spuds 60 is identical with the number of cavities 36 in face plate 32. Back plate section 51 has an upstream side 53 and a downstream side 55. As shown in FIG. 4 each spud 60 is generally conically shaped having its base united with downstream side 55. Each spud 60 converges away from downstream side 55 and is truncated near its apex to form a concave tip 62, the concavity of tip 62 designed to assure perfect impingement of the propellant streams. Extending through the axis of spud 60 is an elongated orifice 64 through which a stream of fuel propellant is designed to flow. The outer periphery 66 is formed with four equiangularly spaced grooves 67 that extend lengthwise of spud 60 from side 55 to tip 62. The function of grooves 67, as shall be more fully described, is to cooperate with portions of face plate 32 in forming propellant orifices.

To assemble injector 10, face plate 32 and spud plate 34 are interfitted. This would be easily done by inverting spud plate 34 from its position as shown in FIG. 3 and placing it onto face plate 32 as shown in FIG. 2. The individual spuds 60 are designed to register with and project into corresponding cavities 36 of face plate 32. When these two components are perfectly interfitted as shown in FIG. 1, the peripheral walls 66 of the spuds will be in flush engagement with cavity walls 37. A fluid tight seal results along the line or area contact between spud peripheries 66 and cavity walls 37. This sealing zone is interrupted by grooves 67 which cooperate with adjacent portions of cavity walls 37 to constitute propellant orifices 80. Thus the cavity walls 37 in addition to performing the function of seating and sealing also constitute together with grooves 67 propellant orifices 80. As mentioned, conventional injector plates must be drilled to form flow orifices. In addition to being costly and time consuming when a drilled orifice does not satisfy exacting precision standards the entire plate must be rejected. It can be seen therefore that avoiding drilling techniques to form propellant orifices is desirable.

The problems imposed by drilling are eliminated by the instant invention. As pointed out, one pattern of propellant orifices is constituted by the cooperation of grooves 67 and adjacent portions of cavity wall 37 which together define orifices 80. In accordance with the instant invention, even orifices 64 extending centrally through spuds 60 may be formed by means other than drilling techniques. This is possible because orifices 64 are perpendicular to the plane of back plate section 51 and parallel relative to one another. They are therefore capable of being cast without the need for drilling by using suitable dies formed into the desired contours of the plates. It should be pointed out that when injector 10 is used in conjunction with a monopropellant system as opposed to a bipropellant system there would be no need for centrally disposed orifices such as orifices 64.

When injector 10 is fully assembled and prepared to operate as shown in FIG. 1, the upstream side 38 of face plate 32 and the downstream face 55 of spud plate 34 are spaced from one another by a distance sufficient to constitute a manifold 71. When oxidizer propellant from tank 24 breaks through burst diaphragm 28 it will pass into circular shaped manifold 71. The full boundary of manifold 71 is constituted by face plate 32, spud plate 34 and wall portion 75 of oxidizer tank 24. After entering manifold 71, the pressurized oxidizer propellant is injected through oxidizer orifices 80. Simultaneously pressurized fuel propellant is being discharged from the fuel manifold 83 through fuel orifices 64. The respective propellant stream impinge to develop the desired spray pattern within combustion chamber 14.

As shown in FIGS. 1, 3, and 4, spud plate 34 is integrally formed with projections 91 that extend axially and downstream from the outer edge of side 55. The purpose of projections 91 is to, along with spuds 60, bear a portion of the load and maintain the proper spacing between plates 32 and 34. The lengths of spuds 60 are greater than the depths of cavities 36 so that when they are interfitted, manifold space 71 is automatically formed. Projections 91 are therefore optional.

The material from which the two injector components are cast may, for example, be casting alloys such as 360 aluminum or 380 aluminum. 360 aluminum is composed of 9.5% silicon, 0.5% magnesium and the remainder is pure aluminum. 380 aluminum has 9.0% silicon, 3.5% copper and the rest is pure aluminum. To avoid porosity problems, i.e., development of bubbles in the cast structure, that would greatly impair its structural integrity, the components may be cast in successive sections in the order of ⅛" thick. As the thickness of the cast sections become enlarged, the risk of bubble development is rapidly magnified. This is because when molten alloy is quickly forced into a large die cavity, the outside surface of the casting cools rapidly while the molten interior cools slowly. In addition to porosity problems, warpage and cracking may also result. By casting the components by successive sections each section will be substantially uniformly cooled with the concomitant advantage of decreasing porosity problems.

While it is preferred that face plate 32 and spud plate 34 be made by a suitable casting technique as described above, there are alternate techniques for construction injector 10. For example, by suffering a cost penalty individual spuds 60 may be constructed separately from back plate section 51. In this case back plate section 51 may be cast and formed with receiving apertures into which the individual spuds may be inserted and firmly attached by welding. Thus rather than casting spud plate 34 as a unit it may be cast in sections. The necessity of drill holes would still be eliminated and therefore many benefits of this invention can be realized.

In accordance with an alternate embodiment of this invention shown in FIG. 5 a spud plate 94, also made by a suitable casting technique, is of substantially uniform thickness. Designing spud plate 94 in this manner achieves balanced structural strength throughout the plate and more important will minimize the development of high porosity zones. A substantially uniform wall thickness will permit plate 94 to be transformed from its molten state to its solid state at a uniform cooling rate. This will tend to minimize porosity and the danger of the plate becoming fractured at blow-hole zones caused by intense gas pressure.

In this embodiment spuds 95 have walls 96 which are smooth and the grooves (not shown) are formed in the cavity walls of the face plate (not shown). It can be seen that forming the grooves in either plate is within the scope of this invention.

It is contemplated that spud plates 34 or 94 may be injection cast from a suitable plastic material such as polypropylene. The spud plate, unlike the face plate that is directly exposed over a wide area to the combustible products, may be adequately cooled by the propellant.

It should be noted that while the spuds and their associated cavities have been shown as being conically shaped, such geometry is not critical. The particular geometrical shape and contouring of the spuds and cavities as well as the inclination, if any, of the spuds to the injector longitudinal axis is dictated primarily by the flow rate and spray pattern desired. The spuds, for example, could be elliptically shaped. In view of the above description, it can now be appreciated that the instant invention provides a unique injector capable of minimal cost, high production manufacturing techniques, the preferable technique being casting. Cost per injector is greatly reduced primarily due to the complete elimination or at least significant reduction of the number of propellant orifices that must be drilled.

I claim:
1. An injector for injecting a combustible liquid into a gas generating chamber comprising:
   a first plate in a fixed position relative to the walls of a gas generating chamber, said plate having a wall section defining a plurality of cavities extending through said first plate,
   a second plate formed with a plurality of spuds corresponding to the number of cavities in said first plate, the spuds being shaped conically complementing the shape of said cavity, said spuds and cavities having walls that converge towards a merging point within said chamber, each of said spuds being positioned in a corresponding cavity,
   means forming at least one groove in one of the plates, the groove and adjacent wall portion of the other plate constituting an orifice extending lengthwise of each of said spuds, the mating surfaces of the spuds and cavities between said groove being in a fluid tight relationship when said spud is positioned within its corresponding cavity, and means separating portions of the plates to form a manifold therebetween for containing liquid to be injected, the manifold being in communication with the orifice.

2. A two component injector for injecting combustible liquid into a gas generating chamber comprising:

a first plate formed with a plurality of wall sections defining cavities extending through the first plate, a second plate formed with a plurality of spuds, the spuds being positioned in a fluid-tight sealing engagement within the cavities, means forming a series of grooves in each spud coextensive with the length thereof, each groove and an oppositely adjacent portion of a cavity wall coextensive therewith constituting an orifice, and wherein the spuds are longer than the cavities are deep so that portions of the plates are separated to form a manifold therebetween for containing a liquid to be injected, the manifold being in communication with the orifices.

3. The injector according to claim 1 wherein a plurality of grooves are formed in each of said spuds having an orientation wherein exiting liquid streams impinge within said chamber, said grooves being substantially lengthwise of the spud.

4. The injector according to claim 3 wherein said grooves are bounded by parallel side walls in each of said spuds and have a uniform depth substantially the length of each spud.

5. The injector according to claim 1 further comprising a third plate forming a second manifold for supplying a second combustible liquid to said injector, said manifold being positioned behind said first and second plates, means forming a series of second orifices through said spuds said second manifold being in communication with said second orifices whereby a stream of second combustible liquid from said second manifold passes through said second orifices and impinges with the streams of said first liquid exiting from said first mentioned orifices into said combustion chamber.

References Cited

UNITED STATES PATENTS

| 993,687 | 5/1911 | Jackson | 239—559 X |
| 1,444,263 | 2/1923 | Mustee | 239—558 X |
| 1,980,321 | 11/1934 | Coleman | 239—558 X |

FOREIGN PATENTS

| 400,388 | 6/1909 | France. |

M. HENSON WOOD, Jr., Primary Examiner

M. Y. MAR, Assistant Examiner

U.S. Cl. X.R.

126—403; 266—23; 431—159